Figure 1:
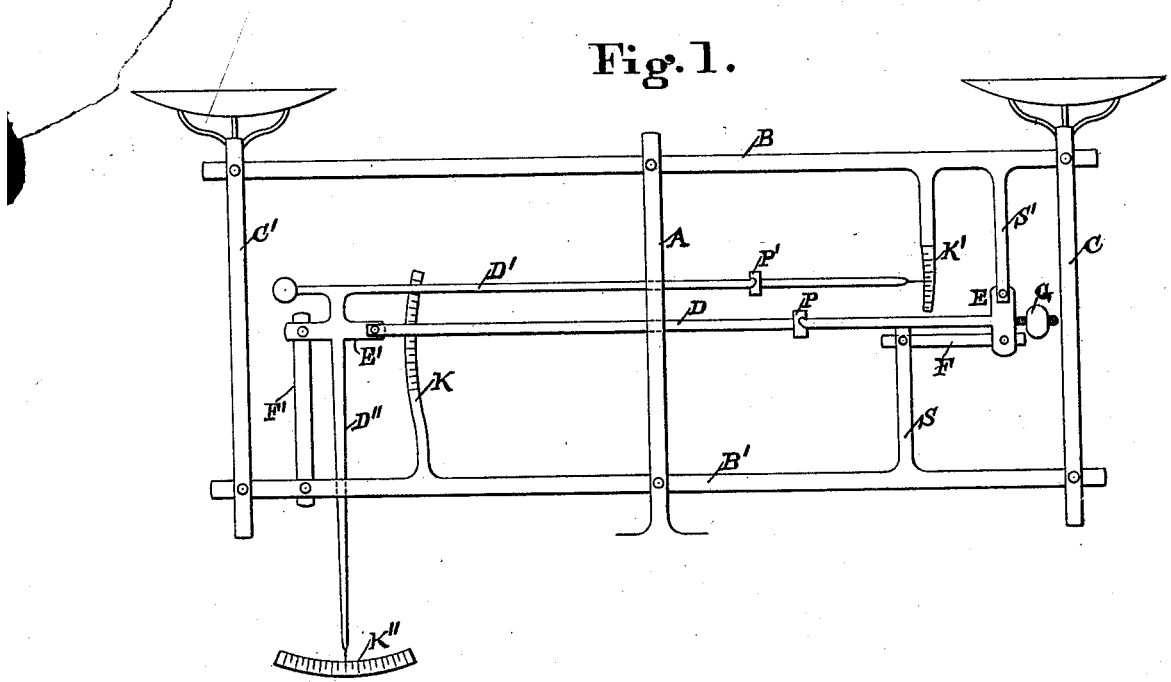

(No Model.) 3 Sheets—Sheet 1.

W. KENT.
BALANCE.

No. 363,468. Patented May 24, 1887.

Attest.
C. D. Kerr
David Doors

Inventor.
William Kent
By Kent Hosea
Attorney.

(Model.)

W. KENT.
BALANCE.

No. 363,468. Patented May 24, 1887.

Attest.
C. D. Kerr
C. E. Lowrie

Inventor.
William Kent
By L. M. Hosea
Attorney.

(No Model.) 3 Sheets—Sheet 3.

W. KENT.
BALANCE.

No. 363,468. Patented May 24, 1887.

Attest.
C. D. Kerr
C. E. Lowrie

Inventor.
William Kent
By Lou Hosea
Attorney.

UNITED STATES PATENT OFFICE.

WILLIAM KENT, OF JERSEY CITY, NEW JERSEY, ASSIGNOR TO THE TORSION BALANCE AND SCALE COMPANY, OF CINCINNATI, OHIO.

BALANCE.

SPECIFICATION forming part of Letters Patent No. 363,468, dated May 24, 1887.

Application filed December 7, 1885. Serial No. 184,895. (No model.)

*To all whom it may concern:*

Be it known that I, WILLIAM KENT, a citizen of the United States, residing at Jersey City, county of Hudson, and State of New Jersey, have invented new and useful Improvements in Balances, of which the following is a specification.

My invention relates to balances, and particularly to that class embodying, in connection with the principal beam oscillating upon a pivotal fulcrum, a secondary beam or index moving upon a separate fulcrum, and used to multiply the motion of the main beam.

In balances of this class, as ordinarily constructed, the secondary or multiplying beam or index has its fulcrum supported outside of and independent of the principal beams or other moving parts of the balance, the balance-beam itself being supported upon one or more immovable standards, and the secondary beam being supported on a separate independent immovable standard. In such a construction any change of the relative positions of the fulcra of the primary and secondary beams—such, for example, as may occur by reason of the settling of foundations or change of level of the supports, (through warping of the structure by variations in temperature, by sagging of the principal fulcrum, or otherwise,)—is apt to cause a movement of the secondary beam or index independent of the proper movement of the principal beam due to the loads placed upon the latter, and thereby error is introduced into the indicated results of the weighing operation. To avoid this source of error in balances, I support the secondary beam or multiplying-index directly upon one of the principal beams or other movable parts of the balance, or upon a strut or standard rigidly attached to such movable part, and attach no part of it to any outside or independent immovable support. By this construction the fulcrum of the secondary beam moves when the principal beam moves; and when the principal beam returns to its normally-balanced or zero position the fulcrum of the secondary beam is compelled to return also to its zero position.

My invention, therefore, may be said to consist in the combination, in a balance or other structure involving an oscillating beam employed as a means of measuring gravity or other force, dimension, &c., of one or more principal beams pivotally mounted upon fixed supports, with one or more auxiliary multiplying-motion beams having their fulcrum-supports upon the principal beams or moving parts connected therewith, and in the means of applying this principle to various forms of such apparatus.

Mechanism embodying my invention is illustrated in the accompanying drawings, in which I have exhibited the application of the essential principle to several constructive forms of ordinary balances.

Similar parts in each drawing are indicated by the same letters.

Figure 3:
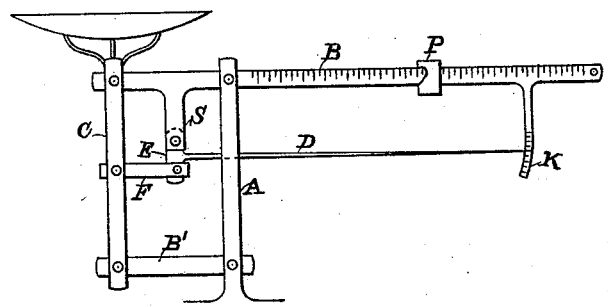
Figure 4:
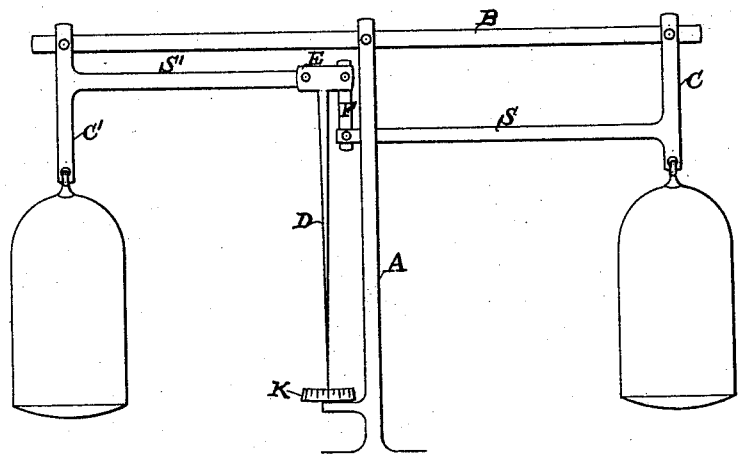
Figure 5:
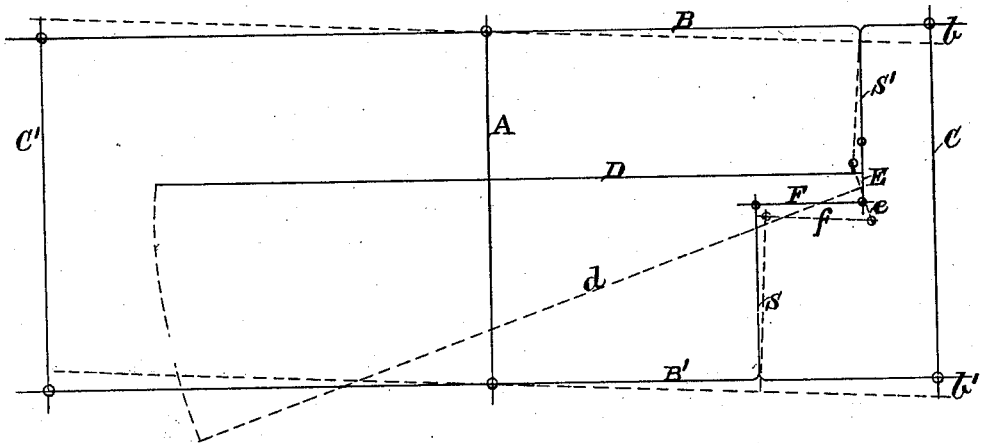
Figure 6:
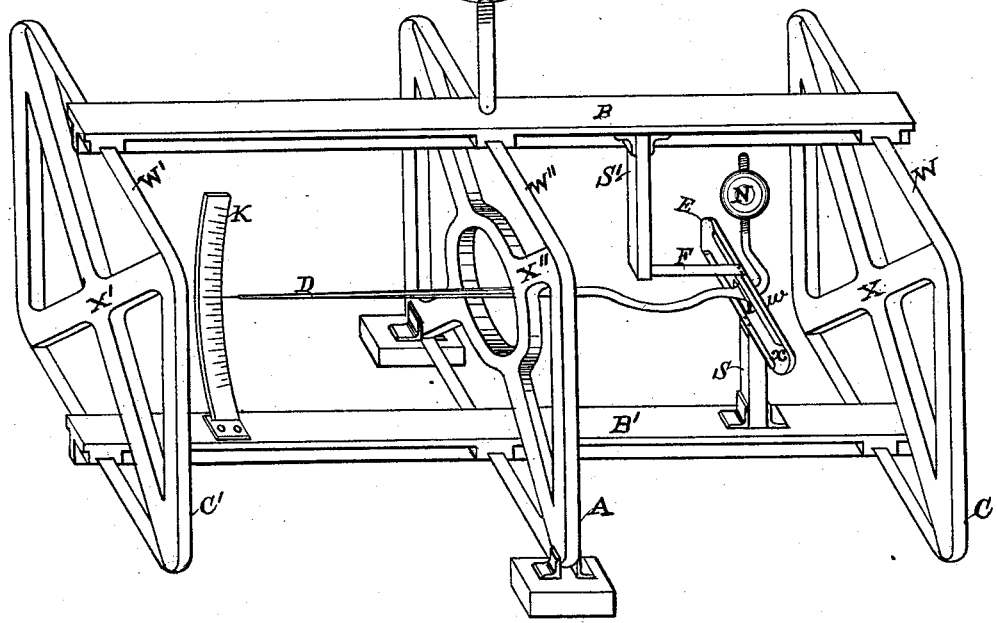

Figures 1, 2, 3, and 4 are vertical elevations of common forms of weighing-balances, all embodying a pivoted beam or beams carrying a weight pan or platform at each end of the beam, or a weight-pan at one end and a sliding indicator-weight at the other, showing the application of my improvement to each form of balance. Fig. 5 is a line diagram indicating the relation of parts in their normal or zero positions and in their deflected positions. Fig. 6 is a perspective view of a double-beam torsion-balance showing my invention applied thereto.

As the general structure of the balances exhibited in Figs. 1, 2, 3, and 4 is in each case old and well known, and as my invention is to be applied thereto as an adjunct, exercising no modifying action upon the operation of the main beam or beams in the performance of its or their main functions, I may abridge the description and present a clearer specification of my own invention by omitting any detailed reference to general and well-known features, and confine myself in this regard to those features only which are immediately concerned in my invention.

In all the cases illustrated in Figs. 1 to 4, inclusive, A designates a main supporting-standard for the beam-fulcrum; B, the main beam pivotally supported upon the standard A; B', (where used,) a duplicate beam or radius-arm, also pivoted to the standard A; C C', vertical standards or links supporting the scale-pans carried upon the terminal pivots of the beam B and connecting the terminal pivots of B and B', where the latter are used.

In all the cases the pivot and fulcrum bearings are represented by small circles, as if these bearings were round pins; but this must be understood as a matter of convenience of illustration merely, and that the scale-bearings may be of any kind suitable for the purpose—either contact-bearings, such as "knife-edges," or "flexion" pivots or "torsion" pivots. The character of the bearings used is not material to my invention in any sense, except in so far as it affects the general operativeness of moving parts and deals with the element of friction.

In each of the cases referred to, S S' are struts or standards rigidly secured to the principal beams B B', respectively, or to the uprights C C'. E F are links pivoted to each other and to the standards S S', respectively, or directly to the beams or uprights C C', without the intervention of struts S S', as the case may be. With these general references a more detailed description may now be given of each case illustrated.

Figure 2:
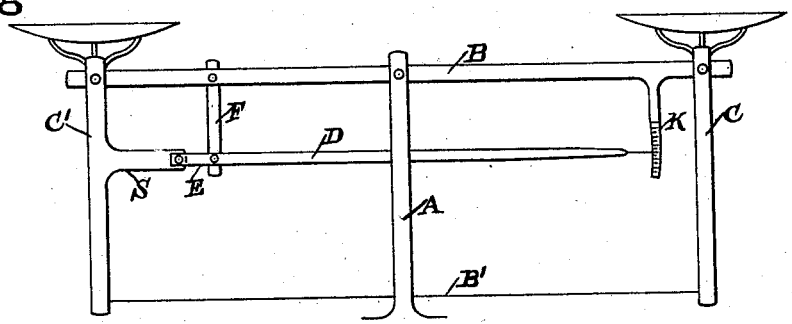

In Fig. 1 the links E and F are pivotally attached, respectively, to the standards S' and S, which standards are themselves rigidly connected, respectively, to the beams B and B'. In Fig. 2 the link E is pivoted to the standard S, which is rigidly connected to the upright C', and the link F is pivoted directly to the beam B. In Fig. 3 the link E is pivoted to the standard S, which is rigidly connected to the beam B, and the link F is pivoted directly to the upright C. In Fig. 4 links E and F are pivoted, respectively, to standards S' and S, which are themselves rigidly connected to uprights C' and C. In all cases it will be observed that if the principal beam B oscillates a trifle out of its normal position the pivots of the links E and F will change their relative positions, and the links E and F will change their angles relatively to each other and to the beam B. If one of these links, as E, is short in proportion to the length of the principal beam, its change of relative angle will be considerably greater than the angle of deflection of the principal beam from its normal position. A secondary beam or multiplying-index, D, rigidly connected to link E, partakes of its angular motion. This is more clearly shown in the diagram, Fig. 5, in which full lines represent the normal position of the beams and links, and dotted lines, with corresponding small letters, the positions after moving the principal beam B through a small angle to $b$.

The index or multiplying beam, it will be seen, moves through a considerable angle from D to $d$.

Fig. 6 shows the application of my invention to the torsion-balance. In this the uprights C C' of Fig. 1 are replaced by cross-pieces X X', over which are stretched the flat wires or bands W W', which serve as pivots. The standard A is also a cross-piece, X", with a stretched wire or band, W". For the link E, I use also a cross-piece, $x$, with its stretched wire or band $w$, which forms both pivots for the link. For the link F, I might use a similar cross-piece; but in the drawings I have shown it made of a thin flexible strip of metal attached at one end of the standard S' and at the other to the wire or band $w$ of the link E. The index D (which in large scales may be a secondary beam with sliding weight, as in P, Fig. 1) is rigidly connected to the cross-piece $x$. The outer end of this index is a pointer moving upon a graduated arc, K.

In the torsion-balance the torsional resistance of all the wires W W' W", &c., is either partially or wholly neutralized by the gravitating tendency of the poise M, supported upon one of the principal beams. The torsional resistance of the wire $w$ is similarly neutralized by the poise N. It is evident, however, that the gravitating tendency of each of the poises M and N counteracts the torsional resistance not only of the wires to which they are respectively attached, but the resistance of the structure as a whole, so that the weight of one poise might be increased and that of the other diminished in a proper ratio in order that the total effect upon the torsional resistance of the scale could remain unchanged. In so far as the poises M and N tend to neutralize the torsional resistance of the wires they act in the same direction; but in another respect they act in opposite directions, as follows:

The normal position of the poises M and N is such that their centers of gravity are directly above their centers of rotation. If the balance is slightly tipped to the right—as by a settling out of level of the floor-support—the poise M, tending to fall to the right, will tend to deflect the right-hand end of the beam B downward. The same tipping of the balance will cause the poise N also to tend to fall to the right; but the effect of this is to deflect the link E also to the right, which will cause a pull through the link F upon the standard S', and hence tend to deflect the right-hand end of the beam B upward. If, now, the poise-weights M and N and the distances of their respective centers of gravity from their points of rotation are properly proportioned one to another, the tendency of the weight M in falling to the right, (caused by the tipping of the support of the balance out of level,) to cause the right end of beam B to move downward, may be exactly compensated by the tendency of the weight N, in falling in the same direction, to cause the right end of the beam to move upward. In this way the necessity of placing a torsion-balance upon a level support may be avoided, and the balance be made to weigh correctly on a support which is not level.

I am aware that the use of two poises so placed in a molecular-pivot balance that one will compensate the other when the balance is tipped out of level is claimed, broadly, in patents granted to Alfred Springer, numbered 340,010 and 340,011, dated April 13, 1886, and that in so far as I use two poises in a torsion or molecular-pivot balance for such purpose, my invention is subordinate to Springer's; but in his application he does not show or refer to a secondary beam, no point of which is attached to an immovable standard, which is the principal feature of my invention, and his construction therefore is not independent of the sag of the principal fulcrums of the balance, which defect is overcome by my invention.

In Fig. 1 I show that the beam D may be used either as a secondary beam with a sliding weight, P, upon it, or as an index or pointer moving upon a graduated arc, K, which arc is preferably attached to a moving part of the balance—as, for example, to the beam B'. The outer end of the secondary beam D may also be pivotally attached to another pair of links, E' F', one of which is pivotally connected to a moving part of the balance, (as to beam B',) and to one of these links, as E, a tertiary beam, D', or a pointer, D", may be rigidly attached. The system of multiplying beams may thus be continued indefinitely, in which all the points of attachment of all of the beams are movable points in the balance structure or struts attached to such movable points.

I do not confine myself in the application of my invention to weighing-balances, as it is evident it may be applied to any moving beam structure in which a secondary beam or multiplying motion of levers or indexes is desired.

I claim as my invention, and desire to secure by Letters Patent of the United States—

1. In combination with a primary beam oscillating upon a fulcrum, a secondary multiplying-motion beam pivotally supported upon the primary beam, and rigidly connected at one end to its pivotal support and at the other end pivoted to an arm on the pivotally-supported index-hand, substantially as set forth.

2. In a weighing-balance, the combination, with a movable part of the balance structure and a primary beam, of a secondary multiplying-motion beam and a fulcrum support therefor upon the moving part of the balance structure, substantially as set forth.

3. In a weighing-balance, the combination, with a moving part of the balance structure and a primary beam, of an automatically-moving secondary multiplying-motion beam, a support for its fulcrum on a moving part of the structure, and a graduated arc, also attached to a moving part of the structure, substantially as described.

4. In a weighing-balance, the combination, with a primary beam, of a secondary beam, D, and a tertiary beam, D', both pivotally supported upon moving parts of the balance, substantially as set forth.

5. In an oscillating beam structure, the combination of the beam B and the pivoted links E F and secondary beam D, substantially as and for the purpose described.

6. In a balance or beam structure, the pointer D, rigidly attached to the link E, the link E, pivotally connected to the link F, the links E F, and a moving part of the beam structure having said links pivotally connected therewith, substantially as described.

7. In a molecular-pivot balance, the combination, with beams B and D, of the poise-weights M and N and the links E and F, whose fulcrums move with the motion of the beam B, substantially as set forth.

8. In a torsion-balance, the torsional fulcrum W", in combination with the beams B" B', supported on said fulcrum W", a secondary beam, D, and links E F, attaching said secondary beam to the moving parts of the balance, whereby the position of the secondary beam D relative to that of the primary beams B B' is not disturbed by reason of any sagging of the pivot W", substantially as set forth.

9. The combination of beams B B', arranged one above the other and flexibly connected, as set forth, the secondary beam D, having a flexible connection with the main beam, and a pointer, substantially as and for the purposes set forth.

In testimony whereof I have hereunto set my hand in the presence of two subscribing witnesses.

WILLIAM KENT.

Witnesses:
   E. J. GRANGER,
   R. C. DARROW.